(12) United States Patent
Tsubokura

(10) Patent No.: US 11,920,582 B2
(45) Date of Patent: Mar. 5, 2024

(54) PLUNGER, PUMP, AND LIQUID ANALYSIS DEVICE

(71) Applicant: KYOCERA CORPORATION, Kyoto (JP)

(72) Inventor: Satoru Tsubokura, Kyoto (JP)

(73) Assignee: KYOCERA CORPORATION, Kyoto (JP)

(*) Notice: Subject to any disclaimer, the term of this patent is extended or adjusted under 35 U.S.C. 154(b) by 19 days.

(21) Appl. No.: 17/789,146

(22) PCT Filed: Dec. 25, 2020

(86) PCT No.: PCT/JP2020/048848
§ 371 (c)(1),
(2) Date: Jun. 24, 2022

(87) PCT Pub. No.: WO2021/132604
PCT Pub. Date: Jul. 1, 2021

(65) Prior Publication Data
US 2022/0364552 A1      Nov. 17, 2022

(30) Foreign Application Priority Data

Dec. 27, 2019   (JP) .................................. 2019-237987

(51) Int. Cl.
*F04B 53/14*      (2006.01)
*F04B 15/00*      (2006.01)
(Continued)

(52) U.S. Cl.
CPC .............. *F04B 53/14* (2013.01); *F04B 15/00* (2013.01); *F16J 1/006* (2013.01); *G01N 30/32* (2013.01); *G01N 2030/326* (2013.01)

(58) Field of Classification Search
CPC .... F04B 1/0408; F04B 1/124; F04B 27/0409; F04B 27/0878; F04B 53/14; F16J 1/006; F16J 1/12
See application file for complete search history.

(56) References Cited

U.S. PATENT DOCUMENTS 4,453,898 A * 6/1984 Leka ..................... F04B 53/164
                                                              417/521
4,572,056 A * 2/1986 Funke .................... F04B 53/14
                                                              92/170.1
(Continued)

FOREIGN PATENT DOCUMENTS

CN              2224301 Y      4/1996
CN          201225274 Y       4/2009
(Continued)

*Primary Examiner* — Michael Leslie
(74) *Attorney, Agent, or Firm* — Procopio, Cory, Hargreaves & Savitch LLP

(57) ABSTRACT

The plunger of the present disclosure includes: a plunger main body section that is made of sapphire, has a pillar shape, and includes a non-penetrating fitting hole extending in a central axis direction from one end portion; a core portion that is inserted into the fitting hole and has a higher thermal conductivity than sapphire; and a joint layer that is interposed between an inner peripheral surface and a bottom surface of the fitting hole of the plunger main body section, and an outer peripheral surface and a tip surface of the core portion, the joint layer being configured to bond the plunger main body section and the core portion. A pump includes the plunger. A liquid analysis device includes the pump.

10 Claims, 4 Drawing Sheets

(51) Int. Cl.
    *F16J 1/00*          (2006.01)
    *G01N 30/32*       (2006.01)

(56) References Cited

U.S. PATENT DOCUMENTS

| | | | | |
|---|---|---|---|---|
| 4,753,581 A | * | 6/1988 | Hiscock | F04B 11/0066 |
| | | | | 417/419 |
| 4,808,092 A | * | 2/1989 | Funke | F04B 53/162 |
| | | | | 417/63 |
| 5,144,882 A | * | 9/1992 | Weissgerber | F04B 53/164 |
| | | | | 417/489 |
| 9,689,384 B2 | * | 6/2017 | Imamura | F04B 53/164 |
| 2005/0214139 A1 | | 9/2005 | Aso | |
| 2010/0089134 A1 | * | 4/2010 | Haertl | G01N 30/36 |
| | | | | 210/136 |
| 2017/0204851 A1 | * | 7/2017 | Savenkov | G01F 15/006 |

FOREIGN PATENT DOCUMENTS

| | | | |
|---|---|---|---|
| JP | 102280 A | 1/1998 | |
| JP | 2004515697 A | 5/2004 | |
| JP | 2005274391 A | 10/2005 | |
| WO | 0248582 A1 | 6/2002 | |

* cited by examiner

PLUNGER, PUMP, AND LIQUID ANALYSIS DEVICE

CROSS-REFERENCE TO RELATED APPLICATIONS

This application is a US national stage application of International Application PCT/JP2020/048848, filed Dec. 25, 2020, and claims priority to Japanese Patent Application No. 2019-237987, filed Dec. 27, 2019, the contents of which are incorporated by reference.

TECHNICAL FIELD

The present disclosure relates to a plunger used in, for example, a pump for a liquid analysis device, a pump including the plunger, and a liquid analysis device.

BACKGROUND ART

A pump with a plunger is used to pressurize and supply a sample solution in a liquid analysis device such as a liquid chromatograph. The plunger comes into contact with various samples and solvents in the pump, and thus requires chemical resistance and corrosion resistance.

A plunger for a liquid chromatograph is typically inserted into a recessed portion such as a holder and used, as described in Patent Documents 1 and 2. Patent Document 3 describes that, as the material of the plunger, sapphire or the like with high hardness and excellent wear resistance and chemical resistance is frequently used, and describes an example of using a metal coated with a ceramic film (paragraph [0004]).

CITATION LIST

Patent Literature

Patent Document 1: JP 2005-515697 T
Patent Document 2: JP H10-2280 A
Patent Document 3: JP 2005-274391 A

SUMMARY

However, while the ceramic coating described in Patent Document 3 is effective in terms of wear resistance, the ceramic coating has a problem of having poor strength and therefore a short life-span.

The plunger of the present disclosure includes: a plunger main body section that is made of sapphire, has a pillar shape, and includes a non-penetrating fitting hole extending in a central axis direction from one end portion; a core portion that is inserted into the fitting hole and has a higher thermal conductivity than sapphire; and a joint layer that is interposed between an inner peripheral surface and a bottom surface of the fitting hole of the plunger main body section, and an outer peripheral surface and a tip surface of the core portion, the joint layer being configured to bond the plunger main body section and the core portion.

The pump of the present disclosure includes the plunger described above. The liquid analysis device of the present disclosure includes the pump described above.

DESCRIPTION OF EMBODIMENTS

Figure 1:
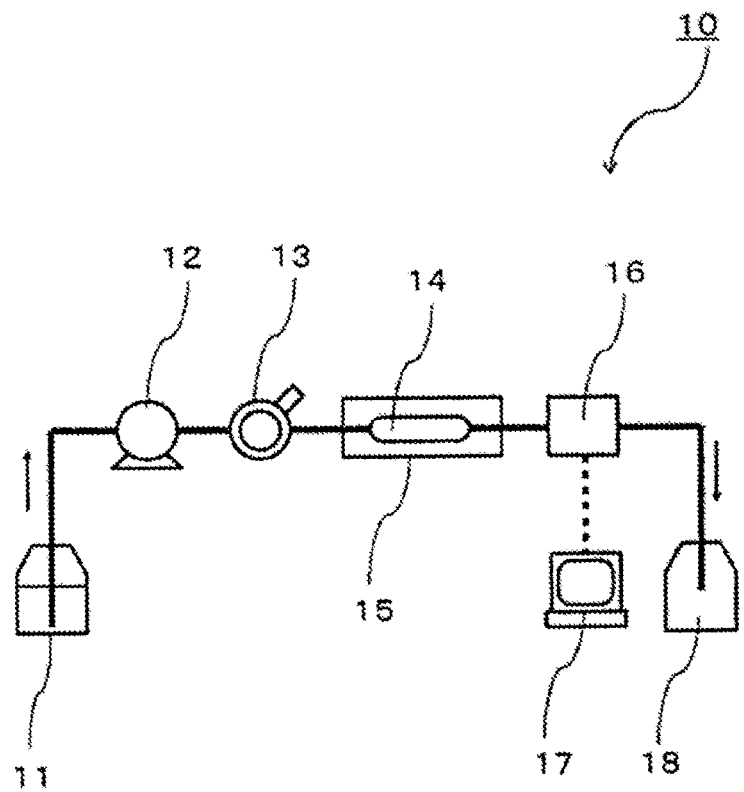
FIG. 1 is a schematic diagram of a liquid chromatograph.

The present disclosure provides a plunger having high heat radiating properties, and excellent sliding wear resistance and corrosion resistance, a pump including the plunger, and a liquid analysis device. A plunger according to an embodiment of the present disclosure, a pump including the plunger, and a liquid analysis device will be described hereinafter with reference to the drawings. FIG. 1 illustrates a liquid chromatograph 10 (liquid analysis device) that uses the plunger of the present disclosure.

Liquid chromatography is an analytical method of passing a sample solution in which a sample is dissolved (referred to as a mobile phase) through a solid or liquid medium (column), referred to as a stationary phase, and separating and detecting an analyzer by utilizing the difference in interaction between the stationary phase and the mobile phase (adsorption, distribution, ion exchange, size exclusion, and the like). Also, an analysis device for performing liquid chromatography is referred to as a liquid chromatograph.

The liquid chromatograph 10 of the present disclosure includes a reservoir 11, a pump 12, an injector 13, a column 14, a column oven 15, a detector 16, a data processor 17, and a waste tank 18. The mobile phase containing a sample is stored in the reservoir 11. The mobile phase pressurized by the pump 12 is supplied to the column 14 via the injector 13, and the detection of the analyzer is performed by the detector 16. The pump 12 includes a plunger 1 illustrated in FIG. 2, a cylinder (not illustrated), a check valve (not illustrated), and the like, and pressurizes and supplies the mobile phase aspirated into the cylinder by sliding between the plunger 1 and the cylinder. In particular, in the high-speed, high-resolution liquid chromatograph 10, a pump 12 capable of high-pressure liquid feeding at 100 MPa or higher may be used.

Generally, during use, a plunger used in a liquid chromatograph or the like pressurizes and supplies a mobile phase (that is, a sample solution in which a sample is dissolved) aspirated into the cylinder by sliding with the cylinder of the pump. In particular, in a high-speed, high-resolution liquid chromatograph, a pump capable of high-pressure liquid feeding at 100 MPa or higher may be used. Therefore, the plunger heats up and thermally expands as a result of sliding with the cylinder at high speed. As a result, the amount of feed per stroke changes, making it difficult to quantify the supply amount of the mobile phase. Also, the sliding resistance between the plunger and the cylinder increases, interfering with the supply of the mobile phase, and therefore, the plunger is required to have high heat radiating properties.

Figure 2:
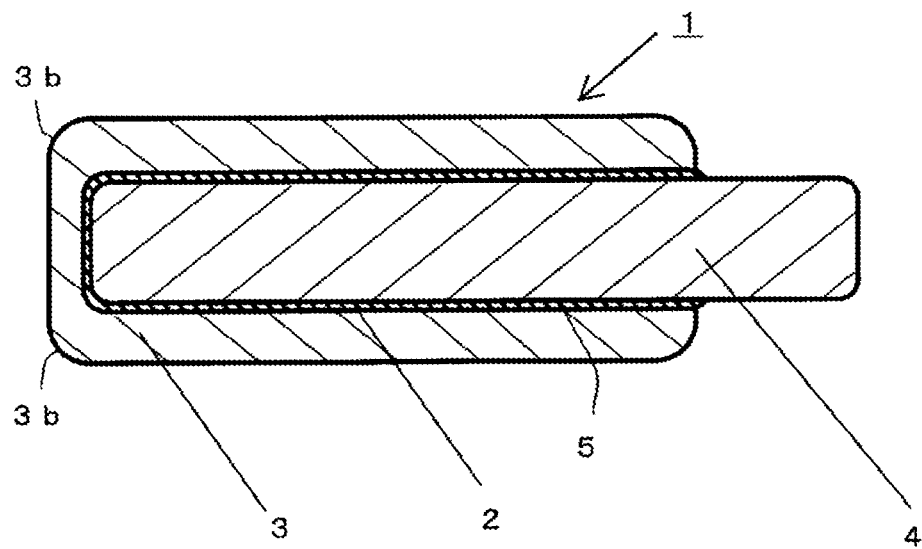
FIG. 2 is a cross-sectional view illustrating a plunger according to an embodiment of the present disclosure.

As illustrated in FIG. 2, the plunger 1 of the present disclosure includes a columnar plunger main body section 3 having a non-penetrating fitting hole 2 extending in a central axis direction from one end portion, and a core portion 4 inserted into the fitting hole 2. The plunger main body section 3 and the core portion 4 are bonded by a joint layer 5 interposed between an inner peripheral surface of the fitting hole 2 of the plunger main body section 3 and an outer peripheral surface of the core portion. The bonding by the joint layer 5 is done on the entire surface of the fitting hole 2 of the plunger main body section 3, that is, the entire inner peripheral surface and the entire bottom surface of the fitting hole 2, and preferably tightly attaches/integrates the plunger main body section 3 and the core portion 4.

The plunger main body section 3 is made of cylindrical sapphire, and the fitting hole 2 is formed from the one end portion by cut processing or the like. Since an outer peripheral surface of the plunger main body section 3 sliding-frictions with the cylinder at high speed, high sliding wear resistance and thermal resistance are required, and since the outer peripheral surface of the plunger main body section 3 comes into contact with the sample solution, high corrosion resistance and chemical resistance are required. Sapphire satisfies these characteristics.

The sapphire is manufactured by, for example, a known manufacturing method that obtains pillar-shaped single crystals, such as an edge-defined film-fed growth method (EFG method). Sapphire has anisotropy in physical properties such as thermal conductivity and coefficient of thermal expansion. In the columnar monocrystalline sapphire, in view of suppressing thermal deformation associated with a temperature change of the plunger main body section 3, it is preferred that a c-axis be aligned with the central axis of the plunger main body section 3, so that thermal expansion in a direction perpendicular to the central axis becomes even. Note that even if the c-axis and the central axis are not in complete alignment, the angle formed by the c-axis and the central axis may be 10° or less.

The obtained cylindrical sapphire is subjected to a processing method such as cutting or grinding from one end portion in the central axis direction, thereby forming the non-penetrating fitting hole 2. The inner peripheral surface of the fitting hole 2 is preferably a cut surface or a ground surface that is not polished after processing, so that the contact surface area with the joint layer 5 can be increased and the bonding strength can be enhanced. Specifically, an arithmetic mean roughness Ra of the inner peripheral surface of the fitting hole 2 is preferably from 0.05 µm to 1.6 µm.

The dimensions of the plunger main body section 3 are such that, for example, the outer diameter is 1 to 5 mm and the length is 10 to 50 mm. The inner diameter of the fitting hole 2 is preferably from ⅓ to ⅔ of the outer diameter of the plunger main body section 3. For example, if the outer diameter is 3 mm, the inner diameter may be from 1 mm to 2 mm. In other words, the thickness of the plunger main body section 3 is preferably 0.5 mm or more and 1 mm or less. From the perspective of thermal conduction, the smaller the thickness of the plunger main body section 3, the better, but the plunger main body section 3 requires to be strong enough to withstand sliding, and therefore processing accuracy (straightness) is also required. A thickness of 0.5 mm or more allows the plunger main body section 3 to sufficiently withstand the sliding, and is favorable in terms of processing accuracy. A thickness of 1 mm or less is favorable in terms of heat removal by thermal conduction.

The depth of the fitting hole 2 is preferably five times or more the outer diameter of the plunger main body section 3 so that the core portion 4 can be inserted deeply. Thus, the contact surface area between the plunger main body section 3 and the core portion 4 with the joint layer 5 therebetween can be made greater than the surface area of the outer peripheral surface, which is the sliding surface of the plunger main body section 3, thereby promoting thermal conduction from the plunger main body section 3 to the core portion 4.

Note that the fitting hole 2 preferably has a circular cross section but may have an elliptical cross section or a polygonal cross section such as a quadrilateral, and a part of the circular cross section may include a recessed portion or a protruding portion. Accordingly, by forming the cross section into a shape other than a circle, the contact surface area between the plunger main body section 3 and the core portion 4 can be increased to promote thermal conduction, and the stress applied to the joint layer 5 can be reduced when a torsional stress is applied between the plunger main body section 3 and the core portion 4, reducing the occurrence of damage (poor bonding) to the joint layer 5.

The core portion 4 inserted into the fitting hole 2 is made of a material having higher thermal conductivity than sapphire. Examples of such material include metals such as aluminum, copper, gold, silver, platinum, and iron, and alloys with these metals as a main constituent. For example, high purity stainless steel with a relatively small amount of additives or the like can be used as the core portion 4. The core portion 4 has a tip inserted to the bottom portion of the fitting hole 2 and has a rear end portion protruding from the fitting hole 2 to dissipate heat.

The core portion 4 in the present embodiment is configured to have a cross-sectional shape so as to be inserted into the fitting hole 2, and is formed in, for example, a cylindrical shape. In addition, if the outer diameter of the core portion 4 is 10 mm or less so that, when the core portion 4 is inserted into the fitting hole 2, a gap is formed therebetween, the inner diameter of the fitting hole 2 is preferably larger than the outer diameter of the core portion 4 in the range from 0.02 mm to 0.2 mm, and more preferably in the range from 0.04 mm to 0.1 mm. Within these ranges, favorable strength and processing accuracy of the plunger main body section 3 are obtained, as well as favorable heat removal from the sliding portion, and the gap can sufficiently be filled with the bonding material for forming the joint layer 5, achieving strong bonding.

The joint layer 5 preferably has a thermal conductivity greater than that of the plunger main body section 3 (sapphire) and a thermal conductivity equivalent to or greater than that of the core portion 4. The joint layer 5 is made of, for example, metal, resin, or a carbon system. For example, the plunger main body section 3 and the core portion 4 can be bonded by filling the fitting hole 2 with a paste that contains a constituent having excellent thermal conductivity such as metal or carbon and an adhesive constituent such as glass, then inserting the core portion 4 into the fitting hole 2, and sintering the paste. In addition, a base metal may be formed on the bonding surface of the plunger main body section 3, and the plunger main body section 3 and the core portion 4 may be bonded by a method such as soldering or brazing. The metal is preferably excellent in adhesiveness toward both the plunger main body section 3 and the core portion 4, and also is preferably excellent in thermal conductivity in order to promote heat dissipation from the plunger main body section 3 to the core portion 4. Examples of such metal include silver and silver alloys.

A resin with joining properties that has excellent thermal conductivity can be used as the resin used in the joint layer 5, and examples include epoxy resins. In particular, a bonding resin containing a constituent excellent in thermal conductivity, such as metal and carbon, is preferred. When bonding, for example, in the same manner described above, the plunger main body section 3 and the core portion 4 can be bonded by filling the fitting hole 2 with a liquid resin, inserting the core portion 4, and curing the liquid resin. Furthermore, it is preferred that the resin have thermal resistance where a thermal resistance temperature is 250° C. or higher.

Next, an example of a method for manufacturing the plunger for a liquid analysis device of the present disclosure will be described. First, the non-penetrating fitting hole 2 extending in the central axis direction from one end portion of the cylindrical plunger main body section 3 (sapphire) is formed to obtain the plunger main body section 3. For example, a sapphire cylinder having a diameter of 3 mm and a length of approximately 30 mm is perforated to have an inner diameter of 1 to 2 mm and a depth of approximately 25 mm (the thickness of the sapphire cylinder is 0.5 to 1 mm), to form the fitting hole 2.

Next, the core portion 4 made of metal is inserted into the fitting hole 2, and both are bonded. In so doing, in view of closing the gap between the fitting hole 2 and the core portion 4 to conduct heat from the plunger main body section 3 to the core portion 4, it is preferable to inject a liquid or paste-like bonding material into the fitting hole 2 in advance, then insert the core portion 4 into the fitting hole 2, and then sinter or cure the bonding material.

When inserting the core portion 4 into the fitting hole 2, the core portion 4 may come into contact with the bottom surface of the fitting hole 2. However, even when the core portion 4 does not come into contact with the fitting hole 2, the thermal conduction is not affected because the joint layer is interposed in the gap therebetween.

In addition, after the core portion 4 is inserted into the fitting hole 2, the liquid bonding material may be injected into the gap between the fitting hole 2 and the core portion 4.

The plunger for a liquid analysis device of the present disclosure is configured to enable, since the plunger main body section 3 is made of sapphire and thus transmits visible light and infrared light, an easy check of the filling status of the paste or brazing material becoming the joint layer 5 and the bonding status after sintering. A laser beam or the like can be emitted to heat only a desired location, such as a poorly bonded portion. Furthermore, since ultraviolet light is also transmitted, a joint layer 5 made of an ultraviolet curing resin can also be used.

As described above, since the plunger main body section 3 and the core portion 4 are tightly attached to each other via the joint layer 5, the frictional heat that is generated on the outer peripheral surface of the plunger main body section 3 due to sliding can be rapidly dissipated through the core portion 4.

Note that the plunger main body section 3 may include a small diameter connection portion 3b that has a smaller outer diameter (i.e., does not contribute to the sliding) than the outer peripheral surface, the small diameter connection portion 3b connecting the outer peripheral surface, which is the sliding surface, and the bottom surface. The small diameter connection portion 3b may be, for example, a small diameter connection portion obtained by R-chamfering or C-chamfering in which the outer diameter continuously changes as in the plunger main body section 3 illustrated in FIG. 2, or may be a stepped small diameter connection portion (not illustrated) in which the outer diameter changes discontinuously. In view of transferring the heat from the sliding surface to the core portion 4 (heat removal), it is preferred that the tip of the fitting hole 2 be located inside the small diameter connection portion 3b (i.e., a position closer to the bottom surface than the tip of the sliding surface in the axial direction). In particular, it is preferred that the tip of the core portion 4 be located inside the small diameter connection portion 3b (i.e., a position closer to the bottom surface than the tip of the sliding surface in the axial direction).

As described above, according to the present embodiment, since the plunger main body section 3 is made of sapphire, excellent sliding wear resistance and corrosion resistance are achieved, and since the core portion 4 inserted into the fitting hole 2 of the plunger main body section 3 has high thermal conductivity, the heat radiating properties of the plunger main body section 3 improve.

Figure 3:
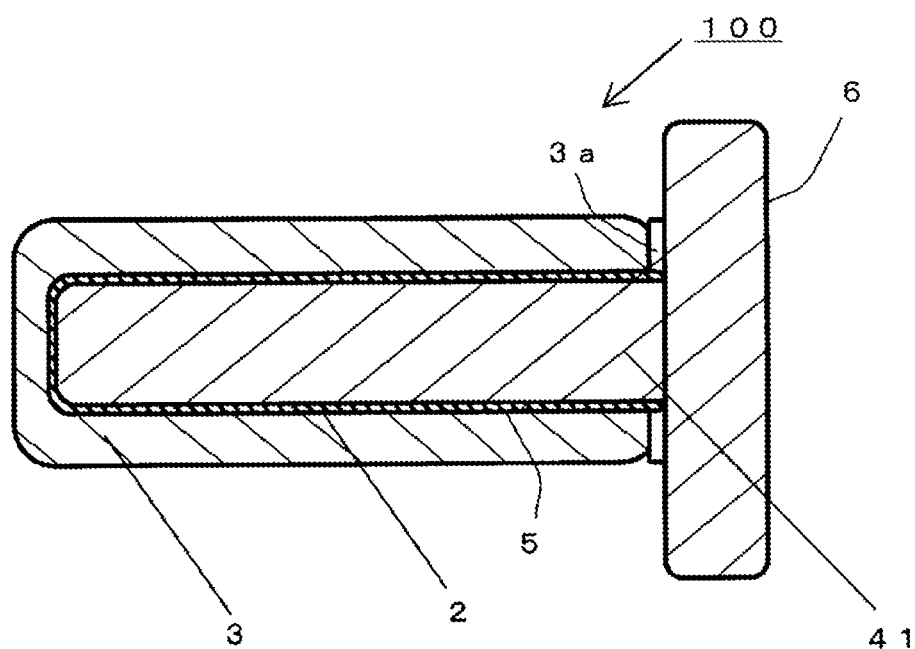
FIG. 3 is a cross-sectional view illustrating a plunger according to another embodiment of the present disclosure.

A plunger for a liquid analysis device according to another embodiment of the present disclosure is illustrated in FIG. 3. Note that the same reference numerals are given to the configuration members of the embodiment illustrated in FIG. 2, and descriptions thereof are omitted accordingly.

A core portion 41 of a plunger 100 illustrated in the drawing includes a projecting portion 6 extending in a radial direction, at a portion exposed from the fitting hole 2. The projecting portion 6 is preferably formed over the entire circumference of the core portion 41 but may be partially formed in a circumferential direction.

The projecting portion 6 is made of a metal, as with the core portion 41, and is formed integrally with the core portion 41, but the projecting portion 6 may be bonded to the columnar core portion 4 illustrated in FIG. 2. Additionally, the projecting portion 6 may be formed of other material with high thermal conductivity other than metals.

The heat dissipation surface area of the core portion 41 is increased by providing the projecting portion 6 on the core portion 41. Furthermore, when the projecting portion 6 faces an end surface 3a of the plunger main body section 3 via the joint layer 5, the heat radiating properties further improve. In other words, the joint layer 5 filling the gap between the core portion 41 and the plunger main body section 3 becomes exposed from an opening of the plunger main body section 3 to the end surface 3a of the plunger main body section 3, and the projecting portion 6 is tightly attached to and bonded to this end surface 3a. Accordingly, the heat transfer from the plunger main body section 3 to the core portion 41 is further promoted, further improving the heat radiating properties.

A plunger for a liquid analysis device according to yet another embodiment of the present disclosure is illustrated in FIGS. 4(a) to 4(d). Note that the same reference numerals are given to the configuration members of the embodiment illustrated in FIG. 2, and descriptions thereof are omitted accordingly.

Figure 4:
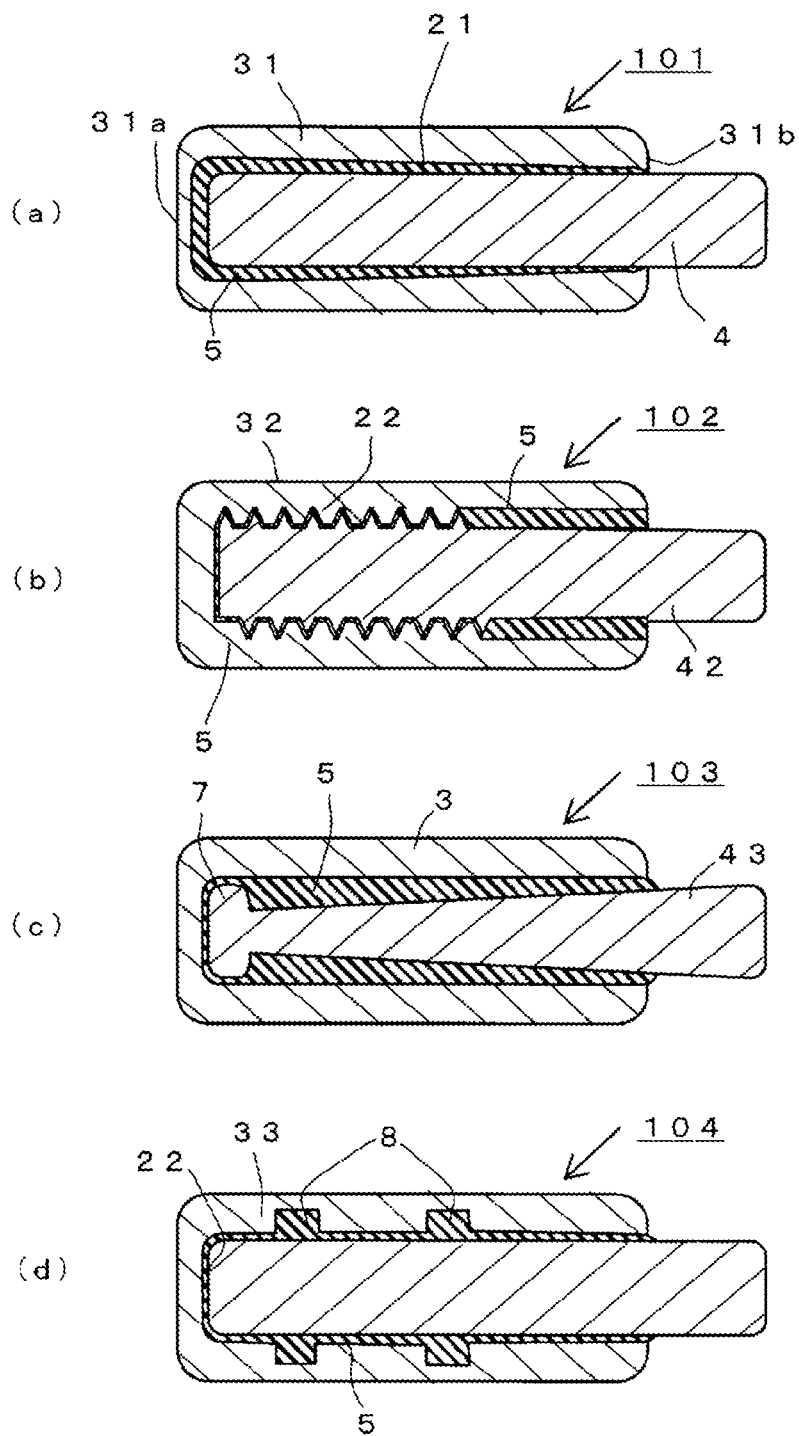
FIGS. 4(a) to 4(d) are each a cross-sectional view illustrating a plunger according to yet another embodiment of the present disclosure.

In a plunger 101 illustrated in FIG. 4(a), a fitting hole 21 of a plunger main body section 31 is formed in a taper shape, and the columnar core portion 4 is inserted into this fitting hole 21 and bonded thereto by the joint layer 5. That is, an inner peripheral surface of the fitting hole 21 is inclined in such a manner that the inner diameter thereof becomes smaller from a bottom portion 31a of the plunger main body section 31 toward an opening 31b. According to the configuration described above, since the contact surface area between the plunger main body section 31 and the joint layer 5 increases, the adhesive strength improves, and heat radiating properties at the time of using the joint layer 5 having high thermal conductivity also improve. In this case, in view of obtaining sufficient heat radiating properties without lowering the strength of the plunger main body section 31, it is preferred that the ratio between an inner diameter (a) of a bottom portion 31a and an inner diameter (b) of the opening 31b (a/b) be from 1.1 to 1.5. Note that instead of forming the fitting hole 21 of the plunger main body section 31 in a taper shape, the core portion 4 may be formed in a taper shape in the opposite direction to the fitting hole 21.

A plunger 102 illustrated in FIG. 4(b) includes a female screw-shaped plunger main body section 32 and a male screw-shaped core portion 42. That is, a helical thread groove is formed in an inner peripheral surface of a fitting hole 22 of the plunger main body section 32, and a thread groove that meshes with the thread groove of the fitting hole 22 is formed in an outer peripheral surface of the core portion 42. The thread groove of the fitting hole 22 and the thread groove of the core portion 42 mesh with each other via the joint layer 5. Since the screw grooves are provided in the fitting hole 22 and the core portion 42 respectively in this manner, the surface area increases, thereby enhancing the heat radiating properties and the bonding strength.

A plunger 103 illustrated in FIG. 4(c) includes a core portion 43 formed in a taper shape where the outer diameter thereof gradually decreases toward a tip portion inserted into the fitting hole 2, and a projecting portion 7 extending in the radial direction is formed on the tip portion of the core portion 43. The core portion 43 is inserted into the fitting hole 2 of the plunger main body section 3 and bonded thereto by the joint layer 5. Since the projecting portion 7 is provided on the tip portion of the core portion 43 and the core portion 43 is formed in a taper shape as described above, the bonding strength and heat radiating properties between the core portion 43 and the plunger main body section 3 improve.

A plunger 104 illustrated in FIG. 4(d) is provided with an annular recessed portion 8 that extends in the circumferential direction, on the inner peripheral surface of the fitting hole 22 of a plunger main body section 33. One or a plurality of recessed portions 8 may be provided. By providing the recessed portion 8 in the inner peripheral surface of the fitting hole 22 in this manner, the heat radiating properties improve and the bonding strength can be ensured.

Note that a recessed portion (not illustrated) extending in the axial direction may be provided in place of the recessed portion 8 extending in the circumferential direction of the plunger main body section 33.

A plunger for a liquid analysis device according to still another embodiment of the present disclosure is illustrated in FIGS. 5(a) to 5(g). Note that the same reference numerals are given to the configuration members of the embodiment illustrated in FIG. 2, and descriptions thereof are omitted accordingly.

Figure 5:
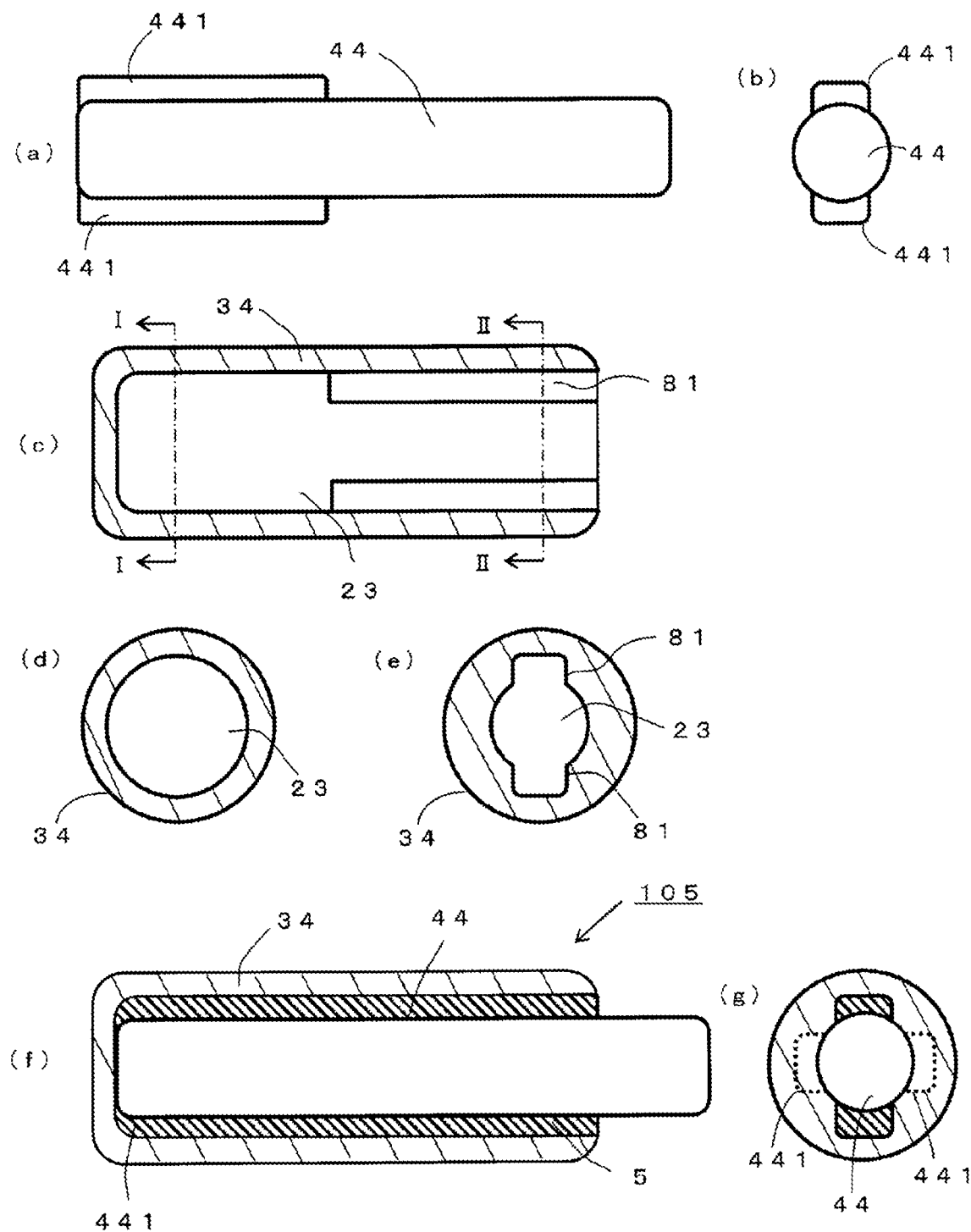
FIGS. 5(a) and 5(b) are, respectively, a side view and a front view illustrating a core portion of a plunger according to still another embodiment of the present disclosure, FIGS. 5(c), (d), and (e) are, respectively, a cross-sectional view of a plunger main body section, a I-I line cross-sectional view, and a II-II line cross-sectional view.
FIG. 5(f) is a cross-sectional view of an assembled plunger.
FIG. 5(g) is a rear view of the assembled plunger.

FIGS. 5(a) and 5(b) illustrate a core portion 44 having, for example, a cylindrical shape, wherein a plurality of protruding portions 441 are provided in a part (i.e., a tip portion) of the core portion 44 at predetermined intervals (two at a 180° interval in the present embodiment). Three protruding portions 441 may be provided at 120° intervals.

As illustrated in FIGS. 5(c) to 5(e), in a plunger main body section 34, a part of the opening portion side of a fitting hole 23 is shaped so as to enable the insertion of the protruding portions 441. That is, recessed portions 81 into which the protruding portions 441 can be inserted are provided (see FIGS. 5(c) and 5(e)). Also, other part of the fitting hole 23 is shaped to enable the protruding portions 441 to rotate (see FIG. 5(d)). For example, the opening portion side of the fitting hole 23 has substantially the same shape as the tip portion of the core portion 44, and a bottom portion of the fitting hole 23 has substantially the same shape as a circumcircle of the protruding portions 441. The protruding portions 441 and the recessed portions 81 correspond to, in a way, keys and key grooves, and can prevent the core portion 44 from falling off, by inserting the core portion 44 into the plunger main body section 34 and then turning them by a predetermined angle. In this state, the core portion 44 is bonded by the joint layer 5, thereby obtaining a plunger 105 illustrated in FIG. 5(f). As illustrated in FIG. 5(g), the core portion 44 is inserted into the plunger main body section 34, which is then rotated by a predetermined angle (90° in the present embodiment), and joined by the joint layer 5. This prevents the core portion 44 from falling off, improves the bonding strength due to the increase in contact surface area with the joint layer 5, and improves heat radiating properties.

The plunger for a liquid analysis device, the pump, and the liquid analysis device according to the present disclosure have been described above on the basis of embodiments, but the present disclosure is not limited to the embodiments described above, and various modifications or improvements can be made without departing from the gist of the present disclosure.

REFERENCE SIGNS LIST 1, 100, 101, 102, 103, 104, 105 Plunger
2, 21, 22, 23 Fitting hole
3, 31, 32, 33, 34 Plunger main body section
3a End surface
3b Small diameter connection portion
31a Bottom portion
31b Opening
4, 41, 42, 43, 44 Core portion
441 Protruding portion
5 Joint layer
6, 7 Projecting portion
8, 81 Recessed portion
10 Liquid chromatograph (liquid analysis device)
11 Reservoir
12 Pump
13 Injector
14 Column
15 Column oven
16 Detector
17 Data processor
18 Waste tank

The invention claimed is:
1. A plunger comprising:
a plunger main body section made of sapphire, having a pillar shape, and comprising a fitting hole that is non-penetrating and that extends in a central axis direction from one end portion of the plunger main body section;
a core portion inserted into the fitting hole and having a higher thermal conductivity than the sapphire; and
a joint layer interposed between
an inner peripheral surface and a bottom surface of the fitting bole of the plunger main body section and
an outer peripheral surface and a tip surface of the core portion, the joint layer being configured to bond the plunger main body section and the core portion.

2. The plunger according to claim 1, wherein
an angle formed by a c-axis of the sapphire configuring the plunger main body section and a central axis of the plunger main body section is 10° or less.

3. The plunger according to claim 1, wherein
the core portion is made of a metal which is aluminum, copper, gold, silver, platinum or iron, or an alloy containing the metal as a main constituent.

4. The plunger according to claim 1, wherein an inner diameter of the fitting hole is from ⅓ to ⅔ of an outer diameter of the plunger main body section, and
a depth of the fitting hole is five times or more of the outer diameter of the plunger main body section.

5. The plunger according to claim 1, wherein the core portion comprises an exposed portion that is exposed from the fitting hole, and a projecting portion extending in a radial direction, from the exposed portion.

6. The plunger according to claim 1, wherein the joint layer has a thermal conductivity higher than a thermal conductivity of the sapphire.

7. The plunger according to claim 1, wherein the joint layer has a thermal conductivity that is equivalent to or greater than a thermal conductivity of the core portion.

8. The plunger of claim 6, wherein the joint layer contains metal, resin, or carbon.

9. A pump comprising: the plunger according to claim 1.

10. A liquid analysis device comprising: the pump according to claim 9.

* * * * *